United States Patent
Yang et al.

(10) Patent No.: US 9,769,154 B2
(45) Date of Patent: Sep. 19, 2017

(54) PASSCODE OPERATING SYSTEM, PASSCODE APPARATUS, AND SUPER-PASSCODE GENERATING METHOD

(71) Applicant: Rowem Inc., Guro-gu, Seoul (KR)

(72) Inventors: Giho Yang, Seoul (KR); Jaeyeob Hwang, Goyang-si (KR)

(73) Assignee: Rowem Inc. (KR)

( * ) Notice: Subject to any disclaimer, the term of this patent is extended or adjusted under 35 U.S.C. 154(b) by 0 days.

(21) Appl. No.: 14/397,167

(22) PCT Filed: Apr. 25, 2013

(86) PCT No.: PCT/KR2013/003549
§ 371 (c)(1),
(2) Date: Oct. 24, 2014

(87) PCT Pub. No.: WO2013/162296
PCT Pub. Date: Oct. 31, 2013

(65) Prior Publication Data
US 2015/0089239 A1    Mar. 26, 2015

(30) Foreign Application Priority Data

Apr. 25, 2012  (KR) .................. 10-2012-0043537
Apr. 25, 2013  (KR) .................. 10-2013-0045795

(51) Int. Cl.
*H04L 29/06*    (2006.01)
*G06F 21/00*    (2013.01)
(Continued)

(52) U.S. Cl.
CPC ............ H04L 63/083 (2013.01); G06F 21/00 (2013.01); G06F 21/34 (2013.01); H04L 9/3226 (2013.01); H04L 9/3236 (2013.01)

(58) Field of Classification Search
CPC ........ G06F 21/36; G06F 21/46; G06F 21/445; G06F 21/602; H04L 9/0894; H04L 2209/72
(Continued)

(56) References Cited

U.S. PATENT DOCUMENTS 5,966,441 A * 10/1999 Calamera ............ H04L 63/0428
                                                           713/167
6,006,333 A    12/1999 Nielsen
(Continued)

FOREIGN PATENT DOCUMENTS

CN    102347942    2/2012
EP    1 253 500    10/2002
(Continued)

OTHER PUBLICATIONS

International Search Report for International Application No. PCT/KR2013/003549 dated Jul. 18, 2013, 4 pages, Republic of Korea.

*Primary Examiner* — Ashok Patel
*Assistant Examiner* — William B Jones
(74) *Attorney, Agent, or Firm* — Thorpe North & Western

(57) ABSTRACT

The present invention relates to a passcode operating system, to a passcode apparatus, and to a super-passcode generating method, which are capable of protecting user authentication information from external hacking. The passcode apparatus of the present invention comprises: one or more processors; a memory; and one or more programs stored in the memory and configured to be executed by the one or more processors. The program includes: a data safekeeping module for storing user-specific passcode data; an input window module for displaying an input window on which multiple icons are arranged; and a passcode-generating module for checking, when icons are selected through the input window module, the character string corresponding to each selected icon on a virtual keyboard contained in
(Continued)

the passcode data, generating a seed passcode in which the checked character strings are combined, and generating a super-passcode for each website using the seed passcode and a site code.

12 Claims, 11 Drawing Sheets

(51) Int. Cl.
  *H04L 9/32* (2006.01)
  *G06F 21/34* (2013.01)
(58) Field of Classification Search
  USPC .............................................. 726/6; 713/184
  See application file for complete search history.

(56) References Cited

U.S. PATENT DOCUMENTS

| | | | |
|---|---|---|---|
| 6,182,229 B1 | 1/2001 | Nielsen | |
| 7,502,931 B2 | 3/2009 | Theimer | |
| 7,596,703 B2 | 9/2009 | Kohiyama et al. | |
| 7,814,025 B2* | 10/2010 | Roever | G06F 21/10 |
| | | | 705/51 |
| 8,082,511 B2* | 12/2011 | Sobotka | G06F 3/0482 |
| | | | 715/745 |
| 8,869,261 B1* | 10/2014 | Carter | G06F 21/36 |
| | | | 455/410 |
| 2002/0067832 A1* | 6/2002 | Jablon | H04L 9/0844 |
| | | | 380/277 |
| 2002/0108060 A1 | 8/2002 | Takamoto et al. | |
| 2004/0181674 A1 | 9/2004 | Theimer | |
| 2004/0187012 A1 | 9/2004 | Kohiyama et al. | |
| 2005/0228994 A1 | 10/2005 | Kasai et al. | |
| 2006/0184764 A1* | 8/2006 | Osaki | G06F 21/64 |
| | | | 711/216 |
| 2006/0230284 A1* | 10/2006 | Fiske | G06F 21/34 |
| | | | 713/184 |
| 2007/0089164 A1 | 4/2007 | Gao et al. | |
| 2008/0168546 A1 | 7/2008 | Almeida | |
| 2008/0172735 A1 | 7/2008 | Gao | |
| 2008/0209350 A1 | 8/2008 | Sobotka et al. | |
| 2009/0036100 A1 | 2/2009 | Lee | |
| 2009/0106825 A1 | 4/2009 | Cerruti et al. | |
| 2010/0011419 A1 | 1/2010 | Seo | |
| 2010/0180336 A1 | 7/2010 | Jones et al. | |
| 2012/0311320 A1* | 12/2012 | Brown | G06Q 20/3274 |
| | | | 713/155 |
| 2013/0111581 A1* | 5/2013 | Griffin | G06F 21/31 |
| | | | 726/19 |
| 2013/0160103 A1 | 6/2013 | Lu et al. | |

FOREIGN PATENT DOCUMENTS

| | | |
|---|---|---|
| JP | 2001-282738 | 10/2001 |
| JP | 2003-122721 | 4/2003 |
| JP | 2005-327235 | 11/2005 |
| JP | 2010-033562 | 2/2010 |
| KR | 2002-0046136 | 6/2002 |
| KR | 10-0499040 | 7/2005 |
| KR | 10-2007-0004191 | 1/2007 |
| KR | 10-2007-0055794 | 5/2007 |
| KR | 10-2008-0011342 | 2/2008 |
| KR | 10-2008-0044716 | 5/2008 |
| KR | 10-2008-0109581 | 12/2008 |
| KR | 10-2009-0013432 | 2/2009 |
| KR | 10-2009-0029343 | 3/2009 |
| KR | 10-2009-0126798 | 12/2009 |
| WO | WO 02/089400 | 11/2002 |
| WO | WO 2004/084481 | 9/2004 |
| WO | WO 2009/157482 | 12/2009 |
| WO | WO 2013/004065 | 1/2013 |

\* cited by examiner

| % | ※ | ♥ | ☎ |
|---|---|---|---|
| R | ♀ | P | ☆ |
| ◇ | X | ♠ | ■ |
| ⊙ | ∇ | ☞ | ♨ |

(a)

| Cxi | K&g | jD0 | @86 |
|---|---|---|---|
| s~b | fF* | t#A | B^4 |
| y.p | M77 | $lz | o8( |
| R,! | sdG | u5E | LWa |

PASSCODE OPERATING SYSTEM, PASSCODE APPARATUS, AND SUPER-PASSCODE GENERATING METHOD

BACKGROUND

1. Field of the Invention

The present disclosure relates to a passcode generating method, and more particularly, to a passcode operating system for protecting user authentication information from external hacking, a passcode apparatus, and a super-passcode generating method.

2. Description of the Related Art

As a common method for user authentication, a password authentication method is being used. The password authentication method stores a password initially inputted from a user, compares a user inputted password to the previously stored password whenever needed, and when they are identical, and determines that the password authentication is successful. Also, technology for authenticating a user using a touch pattern set by the user, evolved from a traditional password authentication method, was disclosed.

It is general for users to generate a password through a combination of information easy to memorize. However, such a password can be easily guessed based on user information (for example, a birthday, a telephone number, etc.).

Accordingly, site operators enhance user authentication through a secondary authentication means such as, for example, a mobile communication terminal, a public authentication certificate, and the like. However, a user authentication method using a secondary authentication means has disadvantages of relatively high costs and user inconvenience involved with having to input secondary authentication information.

SUMMARY

The present disclosure is designed to solve the problem of the related art, and therefore the present disclosure is directed to providing a passcode operating system which minimizes an additional cost required for secondary authentication and does not cause any inconvenience to users, a passcode apparatus, and a super-passcode generating method.

Also, the present disclosure is directed to providing a passcode operating system which enhances security for a user password by automatically generating different passwords for each site through a seed passcode, a passcode apparatus, and a super-passcode generating method.

Furthermore, the present disclosure is directed to providing a passcode operating system which protects user-specific passcode data from phishing attacks, and a passcode apparatus.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

To achieve the objects, there is provided a passcode apparatus according to a first aspect of the present disclosure including at least one processor, a memory, and at least one program stored in the memory and configured to be executed by the at least one processor, wherein the program includes a data safekeeping module to store user-specific passcode data, an input window module to display an input window where a plurality of icons is placed, and a passcode generating module to, when icons are selected through the input window module, ascertain character strings corresponding to each of the selected icons on a virtual keyboard included in the passcode data, and generate a seed passcode in which each of the ascertained character strings is combined, and generate a super-passcode for each web site using the seed passcode and a site code.

To achieve the objects, there is provided a method for generating a super-passcode in a passcode apparatus according to a second aspect of the present disclosure including displaying an input window where a plurality of icons is placed, ascertaining, when a user selects icons on the input window, character strings corresponding to each of the selected icons on a virtual keyboard, generating a seed passcode in which the ascertained character strings are combined, and generating a super-passcode using a site code assigned to a web site and the generated seed passcode.

To achieve the objects, there is provided a passcode operating system for performing user authentication using a super-passcode according to a third aspect of the present disclosure including a web server to receive a request for service from a client terminal, and a passcode apparatus to receive a request for authentication information of the client terminal from the web server, generate a super-passcode using a seed passcode and a site code assigned to the web server, and provide the web server with the super-passcode as user authentication information, wherein the web server authenticates the client terminal based on the super-passcode received from the passcode apparatus.

To achieve the objects, there is provided a method for recovering user-specific passcode data in a passcode apparatus according to a fourth aspect of the present disclosure including receiving a selection of experience information from a user, calculating a hash value of the experience information, and transmitting a data request message including the hash value to a passcode service server, receiving user-specific passcode data encrypted with the hash value being set as a safekeeping address from the passcode service server, and setting the experience information as a secret key, and decoding the encrypted user-specific passcode data using the secret key.

To achieve the objects, there is provided a passcode apparatus according to a fifth aspect of the present disclosure including at least one processor, a memory, and at least one program stored in the memory and configured to be executed by the at least one processor, wherein the program includes a data recovery module to calculate a hash value for experience information selected by a user, transmit a data request message including the hash value to a passcode service server, receive user-specific passcode data encrypted with the hash value being set as a safekeeping address from the passcode server, set the experience information as a secret key, and decode the received encrypted user-specific passcode data using the secret key.

To achieve the objects, there is provided a passcode apparatus according to a sixth aspect of the present disclosure including at least one processor, a memory, and at least one program stored in the memory and configured to be executed by the at least one processor, wherein the program includes a data safekeeping module to store user-specific passcode data, and a data backup module to set experience information selected by a user as a secret key, encrypt the user-specific passcode data using the secret key, calculate a hash value for the experience information, transmit the hash value and the encrypted user-specific passcode data to the passcode server, and store the encrypted user-specific passcode data at a safekeeping address corresponding to the hash value.

To achieve the objects, there is provided a passcode operating system according to a seventh aspect of the present disclosure including a first passcode apparatus to calculate a hash value for experience information selected by a user, transmit a data request message including the hash value to a passcode service server, receive user-specific passcode data encrypted with the hash value being set as a safekeeping address from the passcode server, set the experience information as a secret key, and decode the received encrypted user-specific passcode data using the secret key, and a second passcode apparatus to receive a request for data recovery from the first passcode apparatus, ascertain character strings corresponding to each icon inputted on an input window where a plurality of icons is placed on a virtual keyboard being stored therein, generate a seed passcode in which the ascertained character strings are combined, determine whether the generated seed passcode matches a seed passcode being stored therein, and transmit data recovery admission or data recovery rejection to the first passcode apparatus based on a result of the determination.

The first passcode apparatus may store the decoded passcode data when the first passcode apparatus receives the data recovery admission from the second passcode apparatus, and may delete the decoded passcode data when the first passcode apparatus receives the data recovery rejection from the second passcode apparatus.

Preferably, when the first passcode apparatus receives the data recovery admission from the second passcode apparatus, the first passcode apparatus may ascertain emergency contact information in the decoded passcode, request the passcode service server to send a text message in which the emergency contact information is set as a receiving phone number and an authentication number is recorded, transmit an authentication number received from a user having the emergency contact information to the passcode service server, and store the decoded passcode data when the authentication numbers are found identical by the passcode service server.

The present disclosure has an advantage of protecting user authentication information from a Brute force attack, a shoulder surfing attack, or the like, by generating a super-passcode irrelevant to user information and using the super-passcode as user authentication information.

Also, the present disclosure has an effect of providing convenience to a user as well as enhancing security for user authentication information, by automatically generating different super-passcodes based on site codes even if the same icon is selected by the user.

Furthermore, the present disclosure has an effect of enhancing security for user-specific passcode data used to generate a super-passcode, by encrypting the passcode data and keeping it on a server so that other user cannot decode the passcode data even if the passcode data is hacked.

Moreover, the present disclosure has a benefit of preventing other user from stealing user-specific passcode data, by performing additional authentication when recovering the user-specific passcode data.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

FIG. 3 is a diagram illustrating an input window and a virtual keyboard according to an exemplary embodiment of the present disclosure.

DETAILED DESCRIPTION

The foregoing objects, features, and advantages will become apparent from the following detailed description with reference to the accompanying drawings, and accordingly, those skilled in the art will be able to easily practice the technical aspects of the present disclosure. Also, in the description of the present disclosure, when it is deemed that certain detailed description of known technology related to the present disclosure may unnecessarily obscure the essence of the disclosure, its detailed description is omitted herein. Hereinafter, an exemplary embodiment of the present disclosure is described in detail with reference to the accompanying drawings.

Prior to the description, the definition of the terms used herein is provided below.

The term "passcode" as used herein represents a character string in which at least one character is combined.

The term "seed passcode" as used herein represents a character string generated based on an icon selected by a user, and is used to generate a super-passcode or recover data.

The term "super-passcode" as used herein represents user authentication information which is provided to an Internet site, and is generated based on the seed passcode and a site code.

The term "site code" as used herein represents a character string assigned to each web site.

Figure 1:
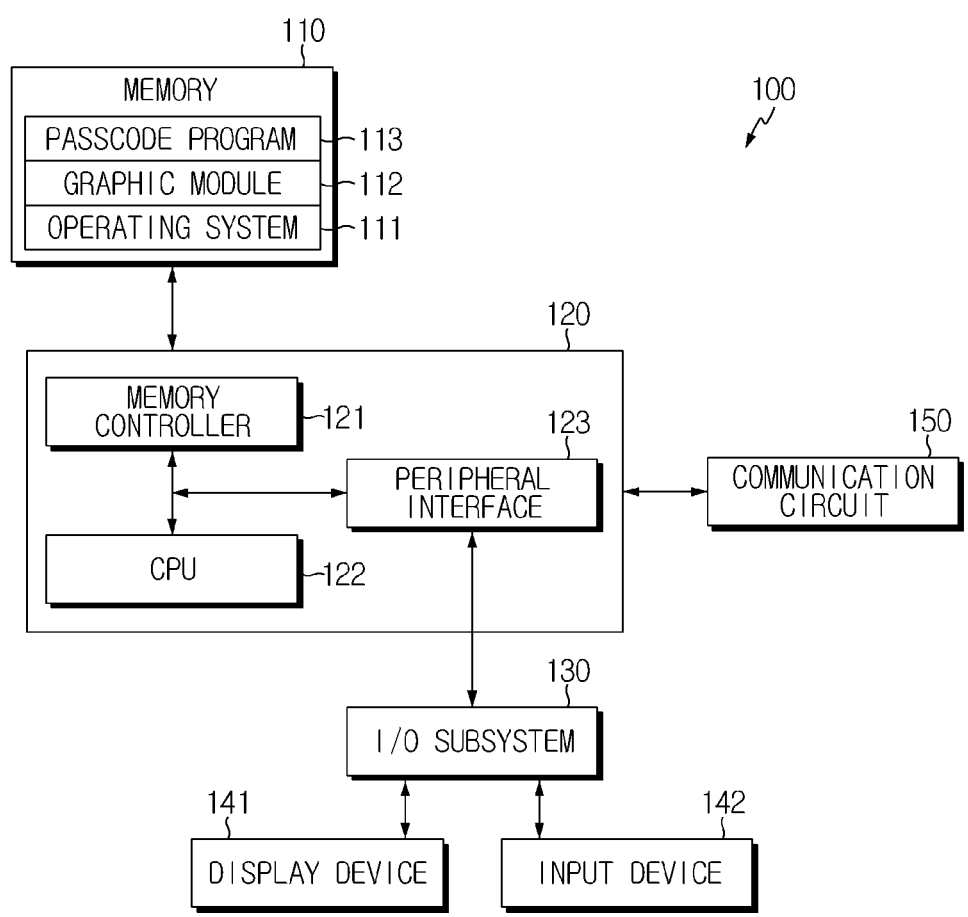
FIG. 1 is a diagram illustrating a passcode apparatus according to an exemplary embodiment of the present disclosure.

FIG. 1 is a diagram illustrating a passcode apparatus according to an exemplary embodiment of the present disclosure.

As shown in FIG. 1, the passcode apparatus 100 includes a memory 110, a memory controller 121, at least one processor (central processing unit; CPU) 122, a peripheral interface 123, an input/output (I/O) subsystem 130, a display device 141, an input device 142, and a communication circuit 150. These components make communication via at least one communication bus or signal line. The components shown in FIG. 1 include at least one signal processing and/or application specific integrated circuit, and may be implemented in either hardware, a combination of hardware and software, or software.

The memory 110 may include a rapid random access memory, and may include at least one non-volatile memory such as a magnetic disk storage device and a flash memory device, or non-volatile semiconductor memory device. In some embodiments, the memory 110 may further include a storage device located far away from the at least one processor 122, for example, a network attached storage device accessible via the communication circuit 150 and a communication network (not shown) such as Internet, Intranet, local area network (LAN), wide LAN (WLAN), storage area network (SAN), or combinations thereof. The access to the memory 110 by the component of the passcode apparatus 100 such as the processor 122 and the peripheral interface 123 may be controlled by the memory controller 121.

The peripheral interface 123 connects an I/O peripheral device of the apparatus to the processor 122 and the memory 110. The at least one processor 122 performs various functions of the passcode apparatus 100 and data processing by executing various software programs and/or a set of instructions stored in the memory 110.

In some embodiments, the peripheral interface 123, the processor 122, and the memory controller 121 may be implemented on a single chip 120. In other embodiments, they may be implemented as separate chips.

The I/O subsystem 130 provides an interface between the I/O peripheral device of the passcode apparatus 100 such as the display device 141 and the input device 142 and the peripheral interface 123.

The display device 141 may use liquid crystal display (LCD) technology or light emitting polymer display (LPD) technology, and the display device 141 may be a capacitive, resistive, or infrared touch display. The touch display provides an output interface and an input interface between the apparatus and a user. The touch display displays a visual output to the user. The visual output may include a text, a graphic, a video, and combinations thereof. A part or all of the visual output may correspond to an object of a user interface. The touch display has a formed touch sensing surface to receive a user input.

The input device 142 is an input means such as a keypad, a keyboard, and the like, and receives an input signal from the user.

The processor 122 is a processor designed to perform an operation related to the passcode apparatus 100 and execute instructions, and for example, the processor 122 may control the reception and manipulation of input and output data between the components of the passcode apparatus 100 using instructions found from the memory 110.

The communication circuit 150 receives and transmits radio electromagnetic waves through an antenna, or receives and transmits data through a wired cable. The communication circuit 150 converts an electrical signal to electromagnetic waves or vice versa, and through the electromagnetic waves, may communicate with a communication network, a mobile gateway device, and a communication device. The communication circuit 150 may include, for example, an antenna system, a radio frequency (RF) transceiver, at least one amplifier, a tuner, at least one oscillator, a digital signal processor, a CODEC chipset, a subscriber identity module (SIM) card, a memory, and the like, but is not limited thereto, and may include a known circuit to perform these functions. The communication circuit 150 may communicate with other device via a wired network or a wireless network such as Internet called World Wide Web (WWW), Intranet, a network and/or a mobile communication network, wireless LAN and/or metropolitan area network (MAN).

As a software component, an operating system 111, a graphic module (a set of instructions) 112, and a passcode program (a set of instructions) 113 are mounted (installed) in the memory 110.

The operating system 111 may be an embedded operating system and includes various software components and/or devices to control and manage general system tasks (for example, memory management, storage device control, power management, etc.) and promotes communication between various hardware and software components.

The graphic module 112 includes various known software components for providing and displaying graphics to the display device 141. The term "graphics" includes a text, a webpage, an icon, a digital image, a video, an animation, and the like, and is not limited thereto, and includes all objects displayable to the user.

The passcode program 113 outputs an input window, through which icons are outputted, to the display device 141, and generates a seed passcode based on an icon selected by the user. Also, the passcode program 113 generates a super-passcode for each site based on a site code and the seed passcode. In this instance, the passcode program 113 may perform a recovery procedure for recovering user-specific passcode data.

The passcode program 113 may be stored in the memory 110 in case in which a passcode application is installed.

Figure 2:
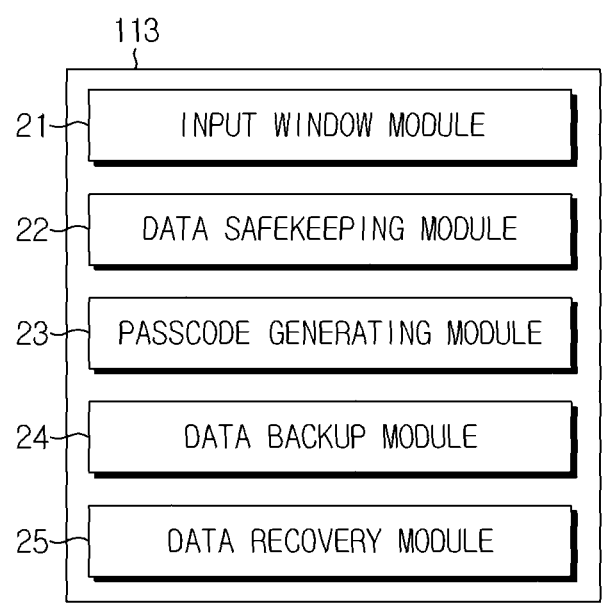
FIG. 2 is a diagram illustrating a structure of a passcode program according to an exemplary embodiment of the present disclosure.

FIG. 2 is a diagram illustrating a structure of a passcode program according to an exemplary embodiment of the present disclosure.

As shown in FIG. 2, the passcode program 113 according to an exemplary embodiment of the present disclosure includes an input window module 21, a data safekeeping module 22, a passcode generating module 23, a data backup module 24, and a data recovery module 25.

The input window module 21 outputs an input window where a plurality of icons is placed to the display device 141. Preferably, the input window module 21 generates a user-specific input window. That is, the input window module 21 generates an input window specific to a user on which a plurality of icons is arranged, and outputs it to the display device 141. Also, the input window module 21 may receive a plurality of user-specific icons from a passcode service server 200 and generate an input window where the plurality of user-specific icons is placed. Alternatively, the input window module 21 may receive an icon pool including at least several tens of icons from the passcode service server 200, arbitrarily select a predetermined number of icons from the icon pool, and generate an input window where the selected icons are placed. Additionally, in the case of differing passcode apparatuses 100, the shape of the icons placed on the input window may differ.

FIG. 3 is a diagram illustrating an input window and a virtual keyboard according to an exemplary embodiment of the present disclosure, and as shown in (a) of FIG. 3, the input window module 21 displays an input window where a plurality of icons is placed.

Although FIG. 3 shows that 16 icons of a 4*4 size are placed, the input window module 21 may output input windows of various sizes (for example, 5*5, 5*4, 6*6, etc.) to the display device 141.

The data safekeeping module 22 performs a function of safekeeping user-specific passcode data. That is, the data safekeeping module 22 stores user-specific passcode data including a plurality of icon images placed on the input window, a virtual keyboard corresponding to the icon images, emergency contact information, identification information of a main passcode apparatus, and a seed passcode. Here, the virtual keyboard is a virtual keyboard corresponding to the input window, and character strings corresponding to each icon are placed on the virtual keyboard.

Referring to (b) of FIG. 3, the data safekeeping module 22 stores the virtual keyboard with the character strings having one-to-one correspondence with the icons placed on the input window. In (b) of FIG. 3, an icon '%' corresponds to a character string 'Cxi', and an icon 'R' corresponds to a character string 'S~b'.

The character strings placed on the virtual keyboard differ for each passcode apparatus 100. That is, the data safekeeping module 22 receives a user-specific virtual keyboard from the passcode service server 200 and stores it, and thus, virtual keyboards stored in each passcode apparatus 100 differ. Additionally, the character strings recorded in the virtual keyboard are irrelevant to user personal information, and correspond to the icons at random.

Also, the data safekeeping module 22 may store site code information in which a site code is recorded for each web site. That is, the data safekeeping module 22 may store site code information in which a site code is respectively mapped to an address of a web site. The site code information may be received from the passcode service server 200, and may be set by the user directly. When the user sets the site code information directly, a user identification (ID) of the corresponding web site may be recorded in the site code information as the site code.

The passcode generating module 23 performs a function of generating a seed passcode and a super-passcode. That is, when the user selects icons on the input window, the passcode generating module 23 ascertains character strings corresponding to the selected icons on the virtual keyboard, and generates a seed passcode in which the ascertained character strings are arranged in an icon selection order. In this instance, when the user sets the seed passcode, the passcode generating module 23 includes the seed passcode in the passcode data of the data safekeeping module 22. Also, the passcode generating module 23 generates a super-passcode using the seed passcode and the site code.

The data backup module 24 performs a function of encrypting the user-specific passcode data and storing it in an external server. Specifically, the data backup module 24 receives an input of a particular play section of an image, a text, a video, or an audio as experience information from the user, sets the received experience information as a secret key, and calculates a hash value of the experience information. Also, the data backup module 24 encrypts the user-specific passcode data using the set secret key, and transmits the encrypted passcode data and the calculated hash value to the passcode service server 200 so that the encrypted passcode data is stored at a safekeeping address having the hash value. Here, the experience information represents information relevant to the user's past memory, for example, a photo, a letter (the letter may be a word file or an image file), a scene of a video, a part of an audio play section, and the like.

The data recovery module 25 performs of receiving the user-specific passcode data from the external server and recovering it. That is, after the data recovery module 25 calculates a hash value for experience information selected by the user, the data recovery module 25 transmits a data recovery request message including the hash value to the passcode service server 200, and receives the encrypted passcode data from the passcode service server 200. Also, the data recovery module 25 sets the experience information selected by the user as a secret key, and decodes the encrypted passcode data using the secret key.

Hereinafter, the operation of the passcode apparatus 100 and a passcode operating system is described in detail through the description with reference to FIGS. 4 through 11.

Figure 4:
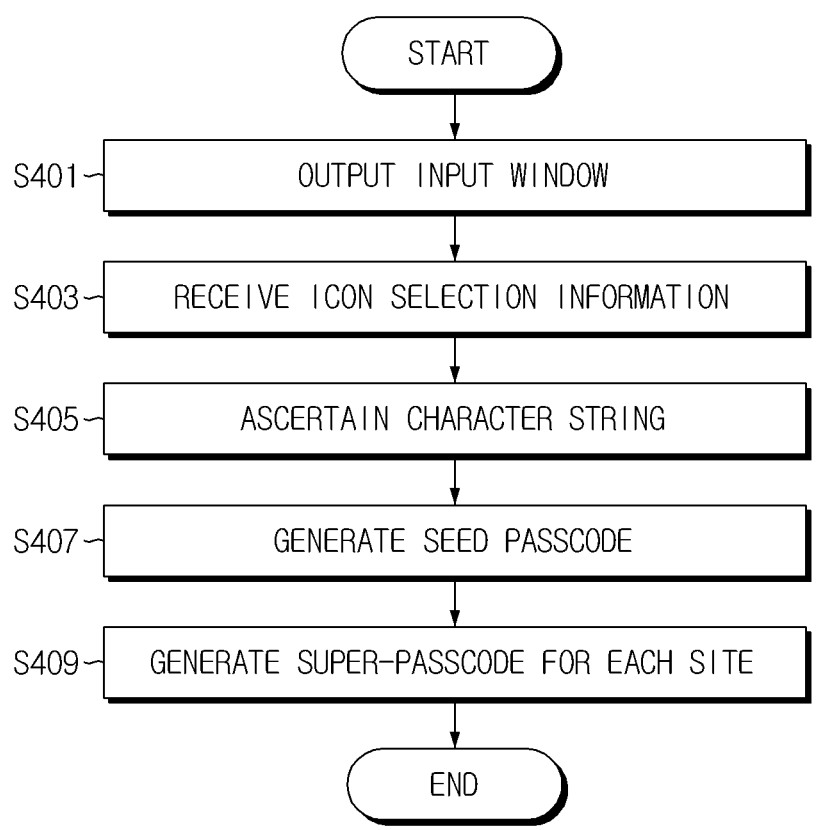
FIG. 4 is a flowchart illustrating a method for generating a super-passcode in a passcode apparatus according to an exemplary embodiment of the present disclosure.

FIG. 4 is a flowchart illustrating a method for generating a super-passcode in the passcode apparatus according to an exemplary embodiment of the present disclosure.

Referring to FIG. 4, when the input window module 21 receives an input of seed passcode setting from the user through the input device 142, the input window module 21 outputs an input window where a plurality of icons is placed to the display device 141 (S401).

Then, the passcode generating module 23 monitors icon selection information of the user inputted on the input window, and sequentially receives a plurality of icon selection information through the input device 142 (S403).

Subsequently, the passcode generating module 23 ascertains character strings corresponding to each icon selected by the user on the virtual keyboard of the data safekeeping module 22 (S405). Subsequently, the passcode generating module 23 generates a seed passcode in which the character strings corresponding to each of the icons sequentially selected by the user are arranged in an icon selection order, and keeps the generated seed passcode in the data safekeeping module 22 (S407). In this instance, the passcode generating module 23 may encrypt the seed passcode and safekeep it in the data safekeeping module 22.

For example, when the input window and the virtual keyboard are as shown in FIG. 3 and the user sequentially selects icons '%', 'R', 'X', and 'P' on the input window, the passcode generating module 23 ascertains on the virtual keyboard that the character strings corresponding to the secret icons '%', 'R', 'X', and 'P' are 'Cxi', 'S~b', 'M77', and 't#A', respectively, generates a seed passcode 'CxiS~bM77t#A' in which the character strings are arranged in an icon selection order, and safekeeps it in the data safekeeping module 22.

In a state that the seed passcode is safekept, the passcode generating module 23 generates a super-passcode for each web site using the seed passcode and the site code (S409). That is, the passcode generating module 23 generates a super-passcode in which the site code is applied to the seed passcode for each site. Preferably, the passcode generating module 23 may generate a super-passcode in which the seed passcode is combined with the corresponding site code for each web site. In this instance, the passcode generating module 23 may generate a super-passcode in which the seed passcode and the site code are combined in a sequential order. For example, when the seed code is 'CxiS~bM77t#A' and the site code is 'site1', the passcode generating module 23 may generate a super-passcode 'CxiS~bM77t#Asite1'. Preferably, the passcode generating module 23 may generate a super-passcode of a combination of the seed passcode and the site code by inserting each character of the site code between each character of the seed passcode. For example, when the seed code is 'CxiS~bM77t#A' and the site code is 'site1', the passcode generating module 23 may generate a super-passcode 'CxsiSi~btM7e7t1#A' in which each character of the 'site 1' is placed between every two characters of the 'CxiS~bM77t#A'. Various methods of applying a certain code to a certain code to generate another code may be provided, and the super-passcode may be generated through other methods.

Through the method of FIG. 4, the passcode apparatus 100 generates the seed passcode based on the selection of the icons by the user, and generates different super-passcodes for each web site using the seed passcode and the site code.

Figure 5:
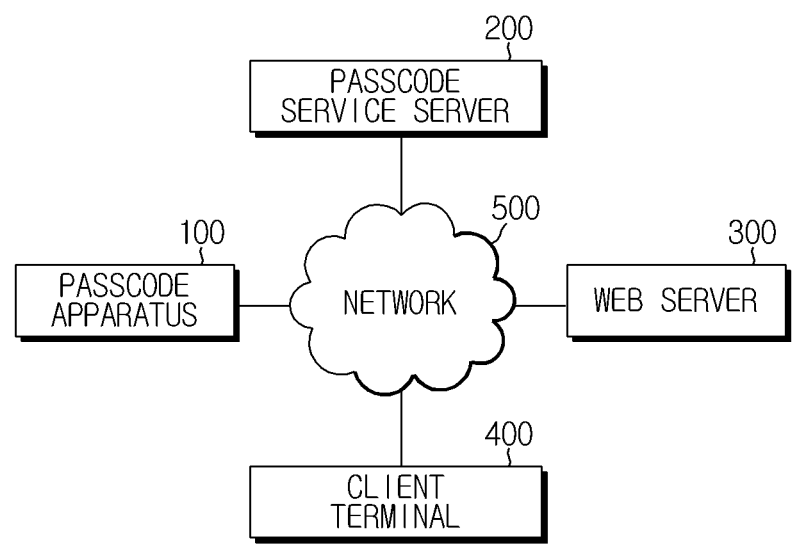
FIG. 5 is a diagram illustrating an architecture of a passcode operating system according to an exemplary embodiment of the present disclosure.

FIG. 5 is a diagram illustrating an architecture of a passcode operating system according to an exemplary embodiment of the present disclosure.

As shown in FIG. 5, the passcode operating system according to an exemplary embodiment of the present disclosure includes a passcode apparatus 100, a passcode service server 200, a web server 300, and a client terminal 400. Each of the passcode apparatus 100, the passcode service server 200, the web server 300, and the client terminal 400 communicates with each other via a network 500. Here, the network 500 includes a mobile communication network and a wired Internet network, and corresponds to a well-known technology in the present disclosure, and thus, its detailed description is omitted herein.

The passcode service server 200 is a server which provides a passcode service, and provides a passcode application to the passcode apparatus 100, and receives encrypted user-specific passcode data from the passcode apparatus 100 and safekeeps it. The passcode service server 200 receives a hash value from the passcode apparatus 100, and safekeeps the encrypted user-specific passcode data at a safekeeping address corresponding to the hash value. Also, the passcode apparatus 100 transmits the encrypted user-specific passcode data to the passcode apparatus 100 which has succeeded authentication.

The web server 300 is a server which provides the user with an online service, for example, a portal service, a banking service, an online shopping service, an electronic commerce service, and the like, and authenticates the user based on a super-passcode received from the passcode apparatus 100. Also, the web server 300 may store identification information of the passcode apparatus 100 mapped to identification information of the client terminal 400, and when a login request is received from the particular client terminal 400, the web server 300 may receive a super-passcode from the passcode apparatus 100 having the identification information mapped to the identification information of the particular client terminal 400, and perform authentication of the particular client terminal 400.

The client terminal 400 includes a desktop computer, a laptop computer, a tablet computer, a mobile communication terminal, a smart phone, and the like, and may receive the user-specific passcode data from the passcode service server 200 and store the same passcode data with the passcode apparatus 100.

Figure 6:
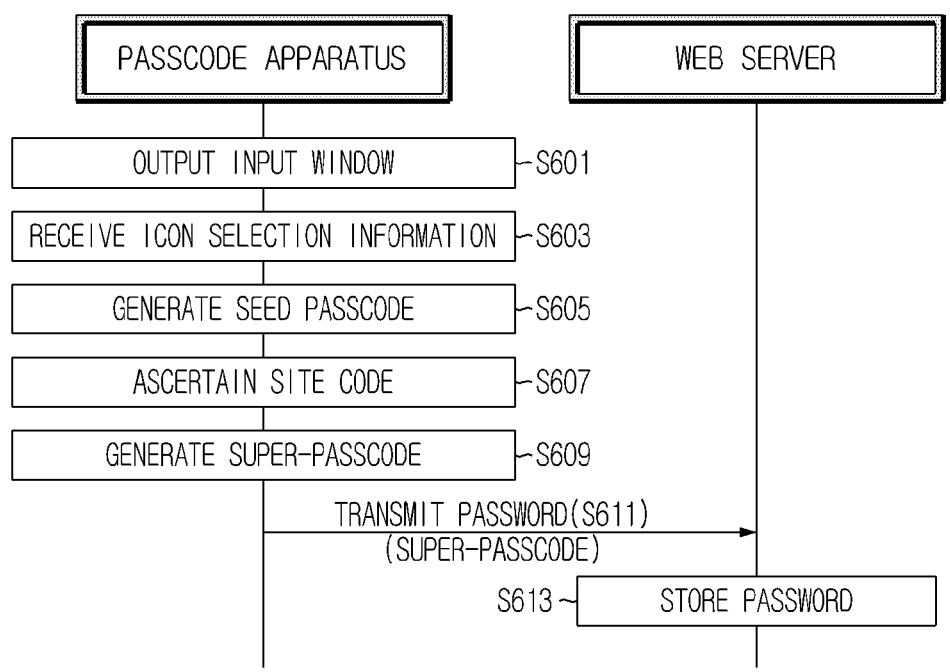
FIG. 6 is a flowchart illustrating a method for setting a super-passcode as a user password in a passcode apparatus according to an exemplary embodiment of the present disclosure.

FIG. 6 is a flowchart illustrating a method for setting a super-passcode as a user password in the passcode apparatus according to an exemplary embodiment of the present disclosure.

Referring to FIG. 6, after the passcode apparatus 100 connects to the web server 300, the passcode apparatus 100 receives a request for password setting from the web server 300. In this instance, when a procedure for initial setting of a password or change of the set password is carried out, the passcode apparatus 100 may receive a request for password setting from the web server 300.

Then, the input window module 21 of the passcode apparatus 100 outputs an input window where a plurality of icons is placed to the display device 141 (S601). Subsequently, the passcode generating module 23 monitors icon selection information of the user inputted on the input window, and sequentially receives a plurality of icon selection information through the input device 142 (S603).

Subsequently, the passcode generating module 23 ascertains character strings corresponding to each icon selected by the user on the virtual keyboard of the data safekeeping module 22. Subsequently, the passcode generating module 23 generates a seed passcode in which the character strings corresponding to each of the icons sequentially selected by the user are arranged in an icon selection order (S605). For example, when the input window information and the virtual keyboard is as shown in FIG. 3 and the user sequentially selects icons '%', 'R', 'X', and 'P', the passcode generating module 23 ascertains on the virtual keyboard of the data safekeeping module 22 that the character strings corresponding to the secret icons '%', 'R', 'X', and 'P' are 'Cxi', 'S~b', 'M77', and 't#A', respectively, and generates a seed passcode 'CxiS~bM77t#A' in which the character strings are arranged in an icon selection order.

Subsequently, the passcode generating module 23 ascertains a site code of the web server 300 the user intends to access in the site code information of the data safekeeping module 22 (S607). Alternatively, the passcode generating module 23 may ascertain an address of a web site intended to access as a site code, and may ascertain a transformed character string obtained by transforming the address of the web site by a preset transformation algorithm as a site code.

Preferably, the passcode generating module 23 determines whether the seed passcode generated in S605 matches the seed passcode stored in the data safekeeping module 22, and when the generated seed passcode does not match the seed passcode stored in the data safekeeping module 22, the passcode generating module 23 outputs a message requesting re-input of a seed passcode, and in contrast, when the generated seed passcode matches the seed passcode stored in the data safekeeping module 22, the passcode generating module 23 ascertains the site code.

Subsequently, the passcode generating module 23 generates a super-passcode for the web site to which the user gets access, using the seed passcode and the site code (S609). That is, the passcode generating module 23 generates a super-passcode in which the site code is applied to the seed passcode. In this instance, the passcode generating module 23 may generate a super-passcode in which the seed passcode and the site code are combined in a sequential order, and may generate a super-passcode by inserting each character of the site code between each character of the seed passcode. Various methods of applying a certain code to a certain code to generate another code may be provided, and the super-passcode may be generated through other methods.

Subsequently, the passcode generating module 23 transmits the generated super-passcode as a password to the web server 300 through the communication circuit 150 (S611). Then, the web server 300 stores the received super-passcode as a user password (S613).

Figure 7:
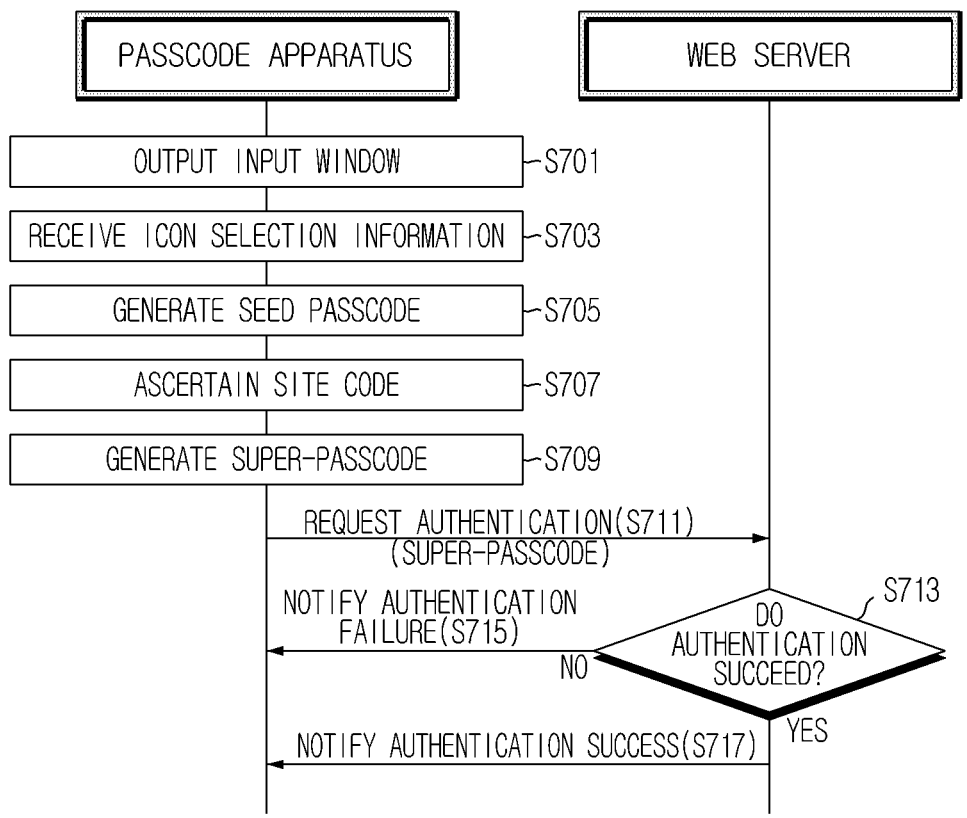
FIG. 7 is a flowchart illustrating a method for authenticating a user using a super-passcode in a passcode operating system according to an exemplary embodiment of the present disclosure.

FIG. 7 is a flowchart illustrating a method for authenticating the user using the super-passcode in the passcode operating system according to an exemplary embodiment of the present disclosure.

Referring to FIG. 7, in a state that the passcode apparatus 100 registers the password on the web server 300 according to the process of FIG. 6, when the user makes an authentication attempt to the web server 300, the input window module 21 of the passcode apparatus 100 outputs an input window where a plurality of icons is placed to the display device 141, to receive a selection of icons from the user (S701). In this instance, the input window module 21 may generate the input window where each icon gets shuffled and is placed at random and output it to the display device 141.

Subsequently, the passcode generating module 23 monitors icon selection information of the user inputted on the input window and sequentially receives a plurality of icon selection information through the input device 142 (S703). Subsequently, the passcode generating module 23 ascertains character strings corresponding to each icon selected by the user on the virtual keyboard of the data safekeeping module 22, and generates a seed passcode in which the character strings corresponding to each of the icons sequentially selected by the user are arranged in an icon selection order (S705). In this instance, the passcode generating module 23 determines whether the generated seed passcode matches the seed passcode pre-stored in the data safekeeping module 22, and when the generated seed passcode does not match the seed passcode pre-stored in the data safekeeping module 22, the passcode generating module 23 may output a message requesting re-selection of icons to the display device 141.

Subsequently, the passcode generating module 23 ascertains a site code of the web server 300 the user intends to access in the site code information of the data safekeeping module 22 (S707). Alternatively, the passcode generating module 23 may ascertain an address of a web site intended to access as a site code, and may ascertain a transformed character string obtained by transforming the address of the web site by a preset transformation algorithm as a site code.

Subsequently, the passcode generating module 23 generates a super-passcode for the web site to which the user gets access, using the generated seed passcode and the ascertained site code (S709). Subsequently, the passcode generating module 23 transmits an authentication request message including the generated super-passcode to the web server 300 through the communication circuit 150 (S711).

Then, the web server 300 authenticates the user of the passcode apparatus 100 by ascertaining the super-passcode included in the authentication request message, and determining whether the super-passcode matches the password stored in S613 of FIG. 6 (S713). When the super-passcode received from the passcode apparatus 100 does not match the password being stored, the web server 300 transmits an authentication failure notification message to the passcode apparatus 100 (S715). In contrast, when the super-passcode received from the passcode apparatus 100 matches the password being stored, the web server 300 transmits an authentication success notification message to the passcode apparatus 100 (S717), and provides an online service to the passcode apparatus 100.

Through the methods of FIGS. 6 and 7, the passcode apparatus 100 may register the super-passcode of a complex type difficult for other users to recognize as the user password on the web server 300. Also, the passcode apparatus 100 protects the user password more safely, by generating the super-passcode differently based on the site code.

Also, the passcode apparatus 100 may provide the web server 300 with authentication information for the client terminal 400 which attempts an online authentication.

Figure 8:
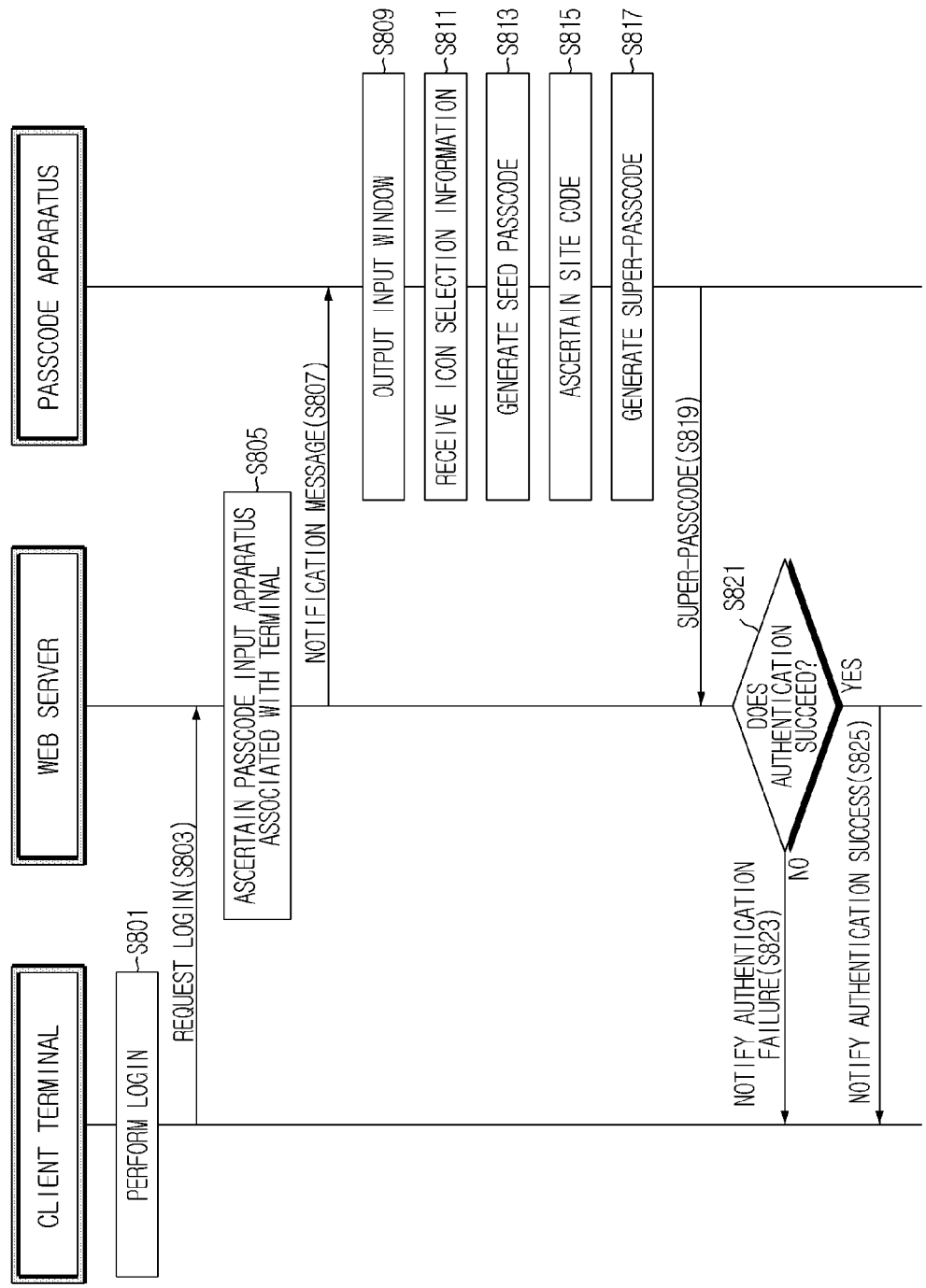
FIG. 8 is a flowchart illustrating a method for performing authentication of a client terminal in a passcode operating system according to another exemplary embodiment of the present disclosure.

FIG. 8 is a flowchart illustrating a method for performing authentication of the client terminal in the passcode operating system according to another exemplary embodiment of the present disclosure.

Referring to FIG. 8, the client terminal 400 receives an input of login execution command to the particular web server 300 from the user (S801). In this instance, the client terminal 400 receives an input of an address of a web site intended to log in and a login ID from the user. Subsequently, the client terminal 400 transmits a login request message including the login ID to the web server 300 (S803).

Then, the web server 300 ascertains identification information of the client terminal 400, and ascertains identification information (for example, an IP address, a telephone number, or a push message notification ID) of the passcode apparatus 100 mapped to the identification information of the client terminal 400 (S805). That is, the web server 300 identifies the passcode apparatus 100 which provides a password of the client terminal 400. In this instance, the web server 300 may recognize an IP address or login ID of the client terminal 400 as the identification information of the client terminal 400. Also, the web server 300 ascertains an access token of the client terminal 400 which attempts to log in.

Subsequently, the web server 300 transmits a notification message notifying that the client terminal 400 has attempted to log in to the passcode apparatus 100 having the ascertained identification information (S807). In this instance, the web server 300 may transmit the notification message in the form of a push message, and records the access token of the client terminal 400 in the notification message.

Then, the communication circuit 150 of the passcode apparatus 100 receives the notification message, and the processor 122 outputs the notification message to the display device 141 to allow the user to recognize that the client terminal 400 placed at a remote location has attempted to log in. Subsequently, the input window module 21 of the passcode apparatus 100 outputs an input window where a plurality of icons is placed to the display device 141, to receive a selection of icons from the user (S809).

Subsequently, the passcode generating module 23 monitors icon selection information of the user inputted on the input window, and sequentially receives a plurality of icon selection information through the input device 142 (S811). Subsequently, the passcode generating module 23 ascertains character strings corresponding to each icon selected by the user on the virtual keyboard of the data safekeeping module 22, and generates a seed passcode in which the character strings corresponding to each of the icons sequentially selected by the user are arranged in an icon selection order (S813).

Subsequently, the passcode generating module 23 ascertains a site code assigned to the web server 300 in the site code information of the data safekeeping module 22 (S815). Alternatively, the passcode generating module 23 may ascertain an address of a web site of the web server 300 having transmitted the notification message as a site code, and may ascertain a transformed character string obtained by transforming the address of the web site by a preset transformation algorithm as a site code.

Subsequently, the passcode generating module 23 generates a super-passcode using the generated seed passcode and the ascertained site code (S817). Subsequently, the passcode generating module 23 transmits the generated super-passcode and the access token of the client terminal 400 to the web server 300 through the communication circuit 150 (S819).

Then, the web server 300 identifies the client terminal 400 to be authenticated, based on the access token received from the passcode apparatus 100. Subsequently, the web server 300 authenticates the client terminal 400 which attempts to log in, by determining whether the super-passcode received from the passcode apparatus 100 and the ID received from the identified client terminal 400 are stored as login authentication information of the user (S821).

When the authentication of the client terminal 400 fails, the web server 300 transmits an authentication failure notification message to the client terminal 400 (S823). In contrast, when the authentication of the client terminal 400 succeeds, the web server 300 transmits an authentication success notification message to the client terminal 400, and provides the client terminal 400 with a web service requested from the client terminal 400 (S825).

Also, the passcode apparatus 100 backs up the user-specific passcode data to the passcode service server 200, and the passcode service server 200 transmits the passcode data to the passcode apparatus 100 or other apparatus, so that the user-specific passcode data may be recovered in the corresponding apparatus.

Figure 9:
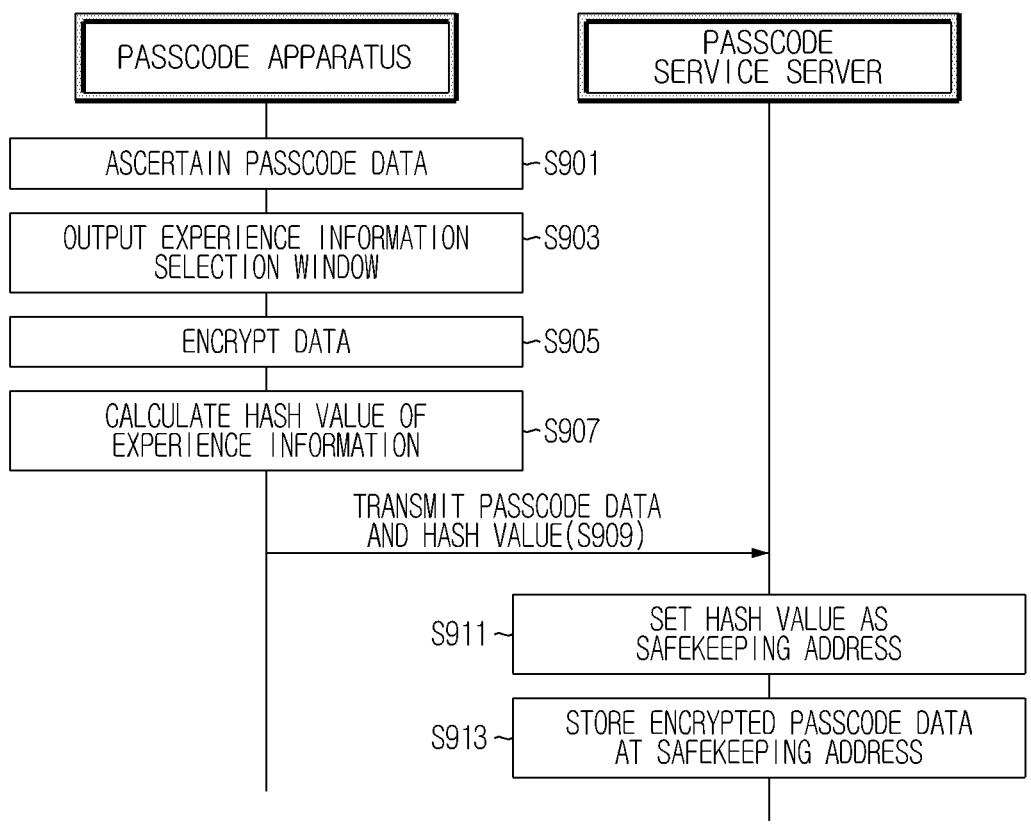
FIG. 9 is a flowchart illustrating a method for backing up user-specific passcode data in a passcode operating system according to an exemplary embodiment of the present disclosure.

FIG. 9 is a flowchart illustrating a method for backing up the user-specific passcode data in the passcode operating system according to an exemplary embodiment of the present disclosure.

Referring to FIG. 9, when a data backup command signal is received from the user through the input device 142, the data backup module 24 of the passcode apparatus 100 ascertains user-specific passcode data including a plurality of icon images placed on the input window, a virtual keyboard corresponding to the icon images, emergency contact information, identification information of a main passcode apparatus, and a seed passcode in the data safekeeping module 22 (S901).

Subsequently, the data backup module 24 outputs an experience information selection window through which the user may select experience information to the display device 141 (S903). Here, the experience information is information relevant to the user's past memory, for example, a photo, a letter (the letter may be a word file or an image file), a scene of a video, a part of an audio play section, and the like. Preferably, when an audio or video is selected as the experience information through the selection window, the data recovery module 25 provides a user interface to allow the user to select a play section, and receives an input of a play section or play time point of the corresponding audio or video from the user.

When the data backup module 24 receives the input of the experience information of the user, the data backup module 24 sets the experience information as a secret key and encrypts the user-specific passcode data using the set secret key (S905). In this instance, the data backup module 24 may set the entire bit string of the experience information as a secret key, or a part of the bit string of the experience information (for example, 128-bit) as a secret key. Also, the data backup module 24 encrypts the user-specific passcode data by inputting the set secret key and the user-specific passcode data into a preset encryption algorithm.

Subsequently, the data backup module 24 calculates a hash value for the experience information (S907), and transmits the hash value and the encrypted user-specific passcode data to the passcode service server 200 using the communication circuit 150 (S909).

Then, the passcode service server 200 ascertains the hash value and the encrypted user-specific passcode data received from the passcode apparatus 100, and sets the hash value as a safekeeping address (S911). Subsequently, the passcode service server 200 stores the encrypted user-specific passcode data in a storage space corresponding to the set safekeeping address (S913). That is, after the passcode service server 200 sets the hash value as a safekeeping address, the passcode service server 200 stores the encrypted user-specific passcode data at the safekeeping address. Preferably, the passcode service server 200 transmits an announcement message announcing the experience information be safekept in other apparatus to the passcode apparatus 100, to induce the experience information to be safekept in the apparatus other than the passcode apparatus 100.

Figure 10:
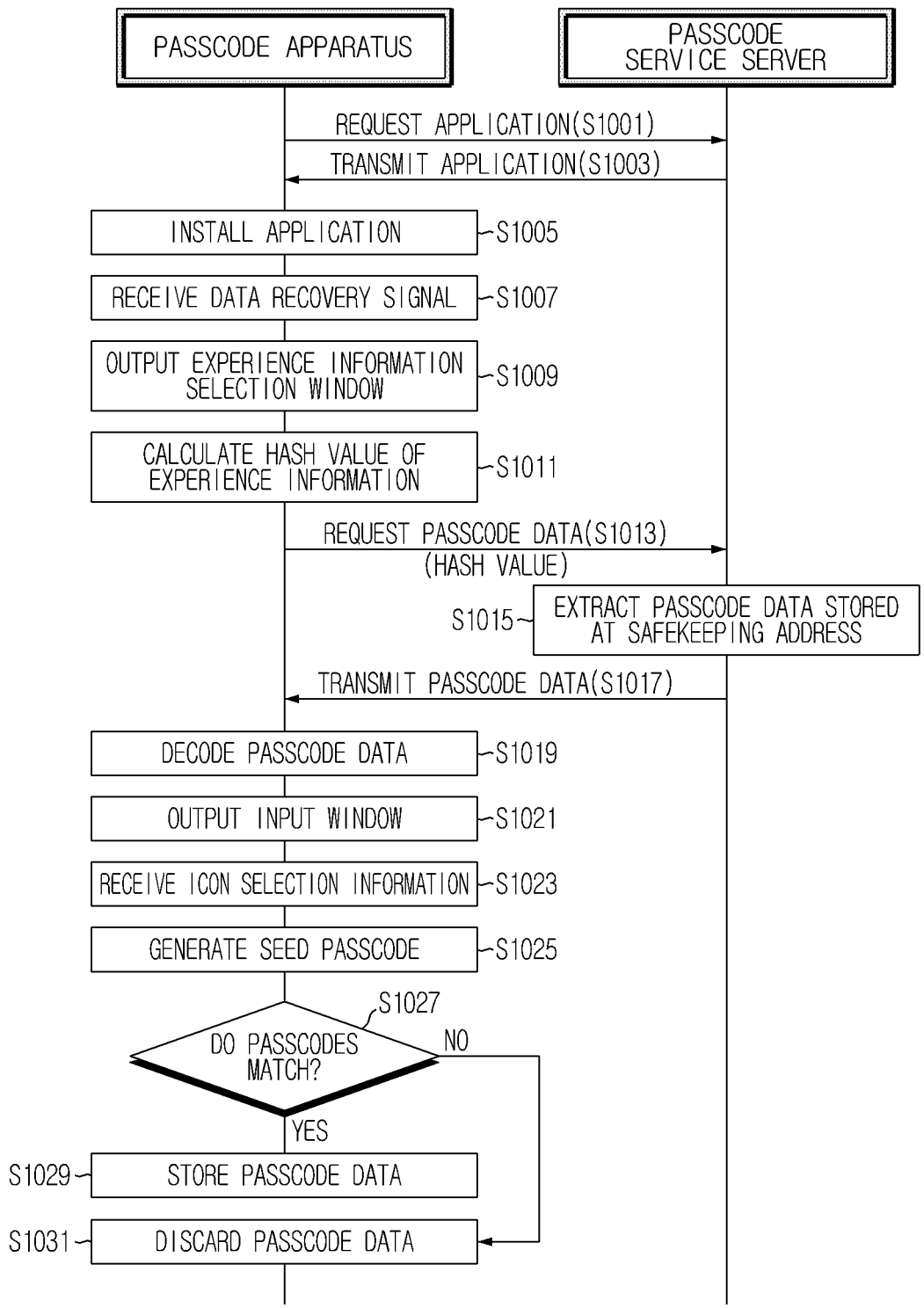
FIG. 10 is a flowchart illustrating a method for recovering a user-specific passcode in a passcode operating system according to an exemplary embodiment of the present disclosure.

FIG. 10 is a flowchart illustrating a method for recovering the user-specific passcode in the passcode operating system according to an exemplary embodiment of the present disclosure.

In the description with reference to FIG. 10, assume that the passcode apparatus 100 recovers deleted passcode data again.

Referring to FIG. 10, the passcode apparatus 100 requests a passcode application to the passcode service server 200 again and receives it (S1001, S1003). Subsequently, the passcode apparatus 100 installs and executes the passcode application (S1005). Accordingly, the passcode program 113 is stored in the memory 100 of the passcode apparatus 100 again. However, user-specific passcode data is not stored in the data safekeeping module 22 of the re-restored passcode program 113.

Subsequently, when the data recovery module 25 of the passcode apparatus 100 receives a data recovery signal from the user through the input device 142, the data recovery module 25 outputs an experience information selection window to the display device 141 (S1007, S1009).

When the data recovery module 25 receives the selection of the experience information from the user through the input device 142, the data recovery module 25 calculates a hash value of the selected experience information (S1011), and transmits a passcode data request message including the hash value to the passcode service server 200 (S1013).

Then, the passcode service server 200 ascertains the hash value in the passcode data request message, and extracts encrypted user-specific passcode data stored in the safekeeping address corresponding to the hash value (S1015). Subsequently, the passcode service server 200 transmits the extracted encrypted user-specific passcode data to the passcode apparatus 100 (S1017).

Subsequently, the data recovery module 25 of the passcode apparatus 100 sets the experience information selected by the user as a secret key, and decodes the encrypted user-specific passcode data using the set secret key (S1019). In this instance, the data recovery module 25 may set the entire bit string of the experience information as a secret key, a part of the bit string of the experience information (for example, 128-bit) as a secret key. Also, the data recovery module 25 decodes the encrypted user-specific passcode data by inputting the set secret key and the user-specific passcode data into a preset decoding algorithm.

Subsequently, the data recovery module 25 of the passcode apparatus 100 commands the passcode generating module 23 to authenticate the user. Then, the passcode generating module 23 commands the input window module 21 to output an input window, and the input window module 21 ascertains icons included in the decoded passcode data and generates an input window where each icon is placed and outputs it to the display device 141 (S1021). In this instance, the input window module 21 may generate the input window where each icon gets shuffled and is placed at random.

Subsequently, the passcode generating module 23 monitors icon selection information of the user inputted on the input window, and sequentially receives a plurality of icon selection information through the input device 142 (S1023).

Subsequently, the passcode generating module 23 ascertains character strings corresponding to each icon selected by the user on the virtual keyboard included in the decoded passcode data, and generates a seed passcode in which the character strings corresponding to each of the icons sequentially selected by the user are arranged in an icon selection order (S1025). Subsequently, the passcode generating module 23 determines whether the generated seed passcode matches the seed passcode included in the decoded passcode data, and when the generated seed passcode matches the seed passcode included in the decoded passcode data, the passcode generating module 23 stores the decoded user-specific passcode data in the data safekeeping module 22 (S1027, S1029).

In contrast, when the generated seed passcode does not match the seed passcode included in the decoded passcode data, the passcode generating module 23 discards the passcode data by deleting the decoded user-specific passcode data, rather than storing it in the data safekeeping module 22 (S1031).

Through the methods of FIGS. 9 and 10, the passcode apparatus 100 encrypts the user-specific passcode data based on the experience information of the user, and stores it in the passcode service server 200. Accordingly, even if other user acquires the user-specific passcode data on the passcode service server 200, in the case where the experience information is inaccurately inputted, the passcode data is not normally decoded. Also, even though the passcode data is lost or deleted, only if the user inputs the experience information and the icons, the user may return the passcode data of the user to an original state.

Also, the passcode operating system may transmit the encrypted passcode data to other apparatus, so that the user-specific passcode data may be recovered in the corresponding apparatus.

Figure 11:
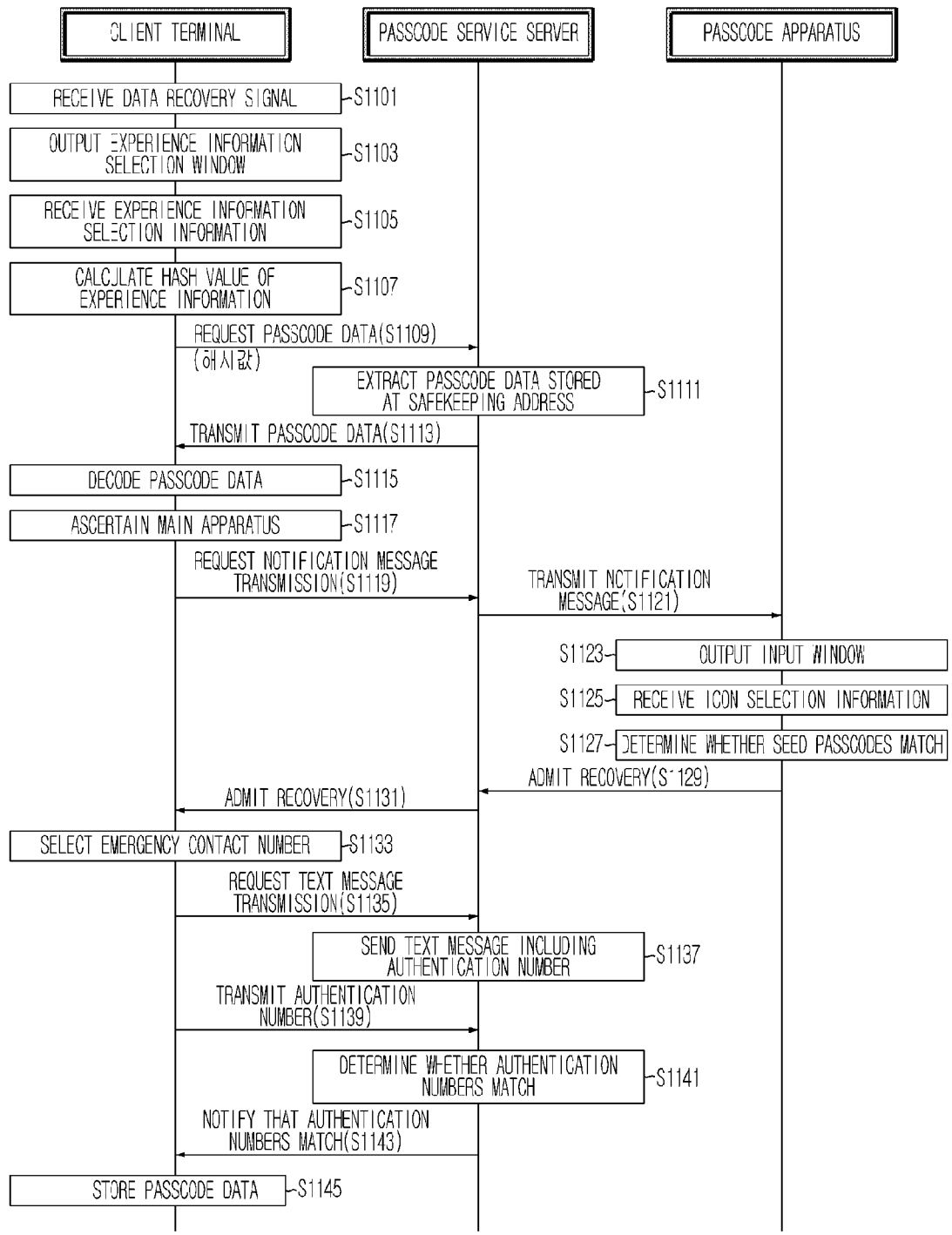
FIG. 11 is a flowchart illustrating a method for providing user-specific passcode data to other apparatus in a passcode operating system according to another exemplary embodiment of the present disclosure.

FIG. 11 is a flowchart illustrating a method for providing the user-specific passcode data to other apparatus in the passcode operating system according to another exemplary embodiment of the present disclosure.

In the description with reference to FIG. 11, an overlapping disclosure with FIG. 10 is abridged and briefly provided.

Referring to FIG. 11, the client terminal 400 has installed a passcode application received from the passcode service server 200, and functions as other passcode apparatus.

The client terminal 400 receives a data recovery signal from the user (S1101), and displays an experience information selection window to receive a selection of experience information from the user (S1103).

Subsequently, when the client terminal 400 receives the selection of the experience information from the user (S1105), the client terminal 400 calculates a hash value for the experience information (S1107). Also, the client terminal 400 transmits a passcode data request message including the hash value to the passcode service server 200 (S1109).

Then, the passcode service server 200 ascertains the hash value in the passcode data request message, and extracts encrypted user-specific passcode data being stored at a safekeeping address corresponding to the hash value (S1111). Subsequently, the passcode service server 200 transmits the extracted encrypted user-specific passcode data to the client terminal 400 (S1113).

Subsequently, after the client terminal 400 sets the experience information selected by the user as a secret key, the client terminal 400 decodes the encrypted user-specific passcode data using the set secret key (S1115). Subsequently, the client terminal 400 ascertains identification information (for example, a telephone number) of a main passcode apparatus in the decoded passcode data, and requests the passcode service server 200 to transmit a notification message to the main passcode apparatus (S1117, S1119). The main passcode apparatus is an apparatus which is notified of recovery of the user-specific passcode data when the passcode data is recovered, and is set by the user. In the description with reference to FIG. 11, the description is made based on that the main passcode apparatus is the passcode apparatus 100 of FIG. 5.

Subsequently, the passcode service server 200 transmits, to the passcode apparatus 100 set as the main passcode apparatus, a notification message notifying that the recovery of the passcode data is being performed in the client terminal 400 (S1121). Preferably, the passcode service server 200 may transmit a notification message including an alert for a phishing risk to the passcode apparatus 100. For example, the passcode service server 200 may transmit a notification message "Someone is trying to recover your passcode data. If the person recovering the passcode data is you, please input an icon, and otherwise, someone apparently acquired your experience information, and thus, please immediately reset a new passcode data and safekeep it. Please note that the operator does not ask your experience information at all" to the passcode apparatus 100.

Then, the display device 141 of the passcode apparatus 100 outputs the notification message, and the data recovery module 25 outputs an input window where a plurality of icons is placed to the display device 141 using the input window module 21 (S1123).

Subsequently, the passcode generating module 23 monitors icon selection information of the user inputted on the input window, and sequentially receives a plurality of icon selection information through the input device 142 (S1125). Subsequently, the passcode generating module 23 ascertains character strings corresponding to each icon selected by the user on the virtual keyboard of the data safekeeping module 22, and generates a seed passcode in which the character strings corresponding to each of the icons sequentially selected by the user are arranged in an icon selection order. Subsequently, the passcode generating module 23 determines whether the generated seed passcode matches the seed passcode safekept in the data safekeeping module 23 (S1127). Subsequently, when the two seed passcodes match, the passcode generating module 23 transmits a data recovery admission message to the passcode service server 200 (S1129). In contrast, when the two seed passcodes do not match, the passcode generating module 23 transmits a data recovery rejection message to the passcode service server 200.

When the passcode service server 200 receives the data recovery admission message from the passcode apparatus 100, the passcode service server 200 transmits the received message to the client terminal 400 (S1131).

Then, after the client terminal 400 ascertains the emergency contact list in the decoded user-specific passcode data and displays the emergency contact list, the client terminal 400 receives a selection of any one emergency contact number in the emergency contact list from the user (S1133). Also, the client terminal 400 requests the passcode service server 200 to transmit a text message to the emergency contact number (S1135).

Subsequently, the passcode service server 200 generates an authentication number of a predetermined digit and sends a text message in which the authentication number is recorded and the emergency contact number is set as a receiving phone number (S1137), and the passcode service server 200 requests the client terminal 400 to transmit the authentication number.

Subsequently, the user of the client terminal 400 attempts to make a call to the selected emergency contact number, and receives an authentication number delivered from a user having received the text message and inputs it into the client terminal 400. Then, the client terminal 400 transmits the authentication number to the passcode service server 200 (S1139).

Then, the passcode service server 200 determines whether the authentication number received from the client terminal 400 matches the authentication number included in the text message (S1141). Subsequently, when the authentication numbers match, the passcode service server 200 transmits an authentication number match notification message to the client terminal 400 (S1143). In contrast, when the authentication numbers do not match, the passcode service server 200 transmits an authentication number non-match notification message to the client terminal 400.

When the client terminal 400 receives the authentication number match notification message from the passcode service server 200, the client terminal 400 safekeeps the same passcode data with the main passcode apparatus by storing the decoded user-specific passcode data. In contrast, when the client terminal 400 receives a recovery rejection message or the authentication number non-match message from the passcode service server 200, the client terminal 400 immediately deletes the decoded passcode data without storing it.

Also, after the client terminal 400 outputs an input window and receives icon selection information from the user of the client terminal 400, the client terminal 400 may generate a seed passcode based on the icon selection information and further determine whether the generated seed passcode matches the seed passcode included in the decoded passcode data. In this instance, when the seed passcode generated based on the icons selected from the user does not match the seed passcode included in the decoded passcode data, the client terminal 400 deletes the decoded passcode data.

While this specification contains many features, the features should not be construed as limitations on the scope of the disclosure or the appended claims. Certain features described in the context of separate exemplary embodiments can also be implemented in combination in a single exemplary embodiment. Conversely, various features described in the context of a single exemplary embodiment can also be implemented in multiple exemplary embodiments separately or in any suitable sub combination.

Although the drawings describe the operations in a specific order, one should not interpret that the operations are performed in a specific order as shown in the drawings or successively performed in a continuous order, or all the operations are performed to obtain a desired result. Multi-tasking or parallel processing may be advantageous under a particular environment. Also, it should be understood that all exemplary embodiments do not require the distinction of various system components made in the above mentioned embodiment. The program components and systems may be generally implemented as a single software product or multiple software product packages.

The above mentioned method of the present disclosure may be implemented as program instructions and recorded in non-transitory computer-readable media (such as, for example, a compact disk-read only memory (CD ROM), random access memory (RAM), read-only memory (ROM), floppy disks, hard disks, magneto-optical disks, and the like). This process may be easily performed by person having ordinary skill in the technical field to which the present disclosure belongs, and its detailed description is omitted herein.

It should be noted various substitutions, modifications, and changes may be made to the present disclosure by person having ordinary skill in the technical field to which the present disclosure belongs without departing from the spirit and scope of the present disclosure, and the present disclosure is not limited by the above described embodiments and the accompanying drawings.

What is claimed is:

1. A passcode apparatus comprising:
at least one processor;
a memory; and
at least one program stored in the memory and configured to be executed by the at least one processor,
the program comprising:
a data safekeeping module to store user-specific passcode data, the user-specific passcode data comprising a plurality of icons, a virtual keyboard on which character strings corresponding to each icon are arranged, and a site code which is different for each website, wherein the plurality of icons and the virtual keyboard in the passcode data are different for each of a plurality of the passcode apparatus;
an input window module to display an input window where the plurality of icons is placed;
a passcode generating module to, when icons are selected by a user on the input window:
ascertain character strings corresponding to each of the selected icons on the virtual keyboard,
generate a seed passcode in which each of the ascertained character strings is combined,
generate a super-passcode differently for each web site in which the seed passcode and the site code of a website requested for authentication of the user are combined,
request authentication of the user by transmitting the super-passcode as a password of the user to a web server associated with the site code of the website, and
receive a result of the authentication from the web server; and
a data backup module to:
receive an input of experience information from the user for backup,
encrypt the user-specific passcode data using the experience information as a secret key,
calculate a hash value of the experience information,
transmit the hash value and the encrypted user-specific passcode data to a passcode service server, and store the encrypted user-specific passcode in a storage space of the passcode service server with the hash value being set as a safekeeping address.

2. The passcode apparatus according to claim 1, wherein the passcode generating module receives a result of the authentication that is successful in a response from the web server when the super-passcode transmitted to the web server matches the super-passcode as stored at the web server.

3. The passcode apparatus according to claim 1, wherein the site code is an Internet address of a web site, a character string set by the user, or a character string received from an external server.

4. The passcode apparatus according to claim 1, further comprising:
a data recovery module to receive an input of experience information from the user, transmit a request for data recovery including a hash value of the experience information inputted to a passcode service server, receive the user-specific passcode data encrypted with the hash value received being set as a safekeeping address from the passcode service server, and decode the encrypted user-specific passcode data using the experience information as a secret key.

5. A super-passcode generating method for generating a super-passcode in a passcode apparatus, the super-passcode generating method comprising:
storing user-specific passcode data, wherein the user-specific passcode data includes a plurality of icons, a virtual keyboard on which character strings corresponding to each icon are arranged and a site code which is different for each website, wherein the plurality of icons and the virtual keyboard in the passcode data are different for each of a plurality of the passcode apparatus;
displaying an input window where the stored plurality of icons is placed;
ascertaining, when a user selects icons on the input window, character strings corresponding to each of the selected icons on the stored virtual keyboard;
generating a seed passcode in which the ascertained character strings are combined;
generating a super-passcode differently for each website, the super-passcode in which the seed passcode and a site code of a web site requested for authentication of the user are combined,
requesting authentication of the user by transmitting the generated super-passcode as a password of the user to a web server associated with the site code of the website, and receiving a result of the authentication from the web server;
receiving an input of experience information from the user for backup;
encrypting the user-specific passcode data using the experience information inputted from the user as a secret key;
calculating a hash value of the experience information;
transmitting the calculated hash value and the encrypted user-specific passcode data to a passcode service server, and storing the encrypted user-specific passcode in a storage space of the passcode service server with the calculated hash value being set as a safekeeping address.

6. The super-passcode generating method according to claim 5, wherein receiving the result of the authentication further comprises receiving a successful result of the authentication in a response from the web server when the generated super-passcode matches a stored super-passcode stored at the web server.

7. The super-passcode generating method according to claim 5, wherein the generating of the super-passcode comprises ascertaining a site code for a web site the user intends to access, and generating a super-passcode using the site code of the web site and the generated seed passcode.

8. The passcode apparatus according to claim 1, wherein:
the web server receives the request for authentication from a client terminal; and
the passcode apparatus receives the request for authentication of the client terminal from the web server and requests authentication of the user by transmitting the super-passcode to the web server, and
the client terminal receives a result of the authentication from the web server.

9. The super-passcode generating method according to claim 5, wherein before the storing of the user-specific passcode data, for the passcode apparatus to recover user-specific passcode data in a passcode apparatus, the method further comprises:
receiving a selection of experience information from a user;
calculating a hash value of the experience information, and transmitting a data request message including the hash value to a passcode service server;
receiving user-specific passcode data encrypted with the hash value being set as a safekeeping address and stored in a safekeeping space of the passcode service server from the passcode service server; and
setting the experience information as a secret key, and decoding the encrypted user-specific passcode data using the secret key,
wherein the storing of the user-specific passcode data comprises storing decoded user-specific passcode data.

10. The super-passcode generating method according to claim 9, further comprising:
before the receiving of the selection,
setting the experience information as a secret key, and encrypting stored user-specific passcode data using the secret key; and
calculating a hash value for the experience information, transmitting the hash value and the encrypted user-specific passcode data to the passcode service server, and storing the encrypted user-specific passcode data at a safekeeping address corresponding to the hash value.

11. The passcode apparatus according to claim 1, wherein when the passcode apparatus is a first passcode apparatus of the user and a client terminal of the user is a second passcode apparatus for storing the passcode data:
to the client terminal calculates a hash value of experience information selected from the user, transmits a data request message including the hash value to a passcode service server, receives user-specific passcode data encrypted with the hash value being set as a safekeeping address from the passcode service server, sets the experience information as a secret key, decodes the received encrypted user-specific passcode data using the secret key, stores the decoded passcode data when receiving data recovery admission from the first passcode apparatus, and deletes the decoded passcode data when receiving data recovery rejection; and
the first passcode apparatus receives a request for data recovery from the client terminal, ascertains character strings corresponding to each icon inputted on an input window where a plurality of icons is placed on the virtual keyboard being stored therein, generates the seed passcode in which the ascertained character strings are combined, determines whether the generated seed passcode matches a stored seed passcode being stored therein, and transmits data recovery admission when the generated seed passcode and the stored seed passcode match or transmits data recovery rejection when the generated seed passcode and the stored seed passcode do not match.

12. The passcode apparatus according to claim 11, wherein the first passcode apparatus ascertains, when receiving the data recovery admission from the second passcode apparatus, emergency contact information in the decoded passcode, requests the passcode service server to send a text message in which the emergency contact information is set as a receiving phone number and an authentication number is recorded, transmits an authentication number received from a user having the emergency contact information to the passcode service server, and stores the decoded passcode data when the authentication numbers are found identical by the passcode service server.

\* \* \* \* \*